April 1, 1969 H. H. BOSTROM ET AL 3,436,082

AUTOMATIC PHONOGRAPH RECORD CLAMPING AND SPEED CONTROLLING MECHANISM

Filed May 6, 1966 Sheet 1 of 3

INVENTORS.
HARRY H. BOSTROM
ALBERT G. KATZMAREK

BY

INVENTORS.
HARRY H. BOSTROM
ALBERT G. KATZMAREK
BY

INVENTORS.
HARRY H. BOSTROM
ALBERT G. KATZMAREK
BY

United States Patent Office 3,436,082
Patented Apr. 1, 1969

3,436,082
AUTOMATIC PHONOGRAPH RECORD CLAMPING AND SPEED CONTROLLING MECHANISM

Harry H. Bostrom, Chicago, and Albert G. Katzmarek, Evanston, Ill., assignors to The Seeburg Corporation, Chicago, Ill., a corporation of Delaware Filed May 6, 1966, Ser. No. 548,275
Int. Cl. G11b 15/46
U.S. Cl. 274—10 6 Claims

ABSTRACT OF THE DISCLOSURE

A record clamping and center-hole speed sensing arrangement, in which a record clamping element on a clamp arm bears against the record at a spot immediately opposite a supporting area on the record turntable during the play of any record, is provided. To permit the uniform displacement of the clamp arm required in this arrangement, a speed sensing member mounted on the clamp arm is reciprocably movable relative to the clamp arm and the clamping element.

This invention relates generally to a means for automatically controlling the speed of a phonograph for different types of records by determining the size of the center-hole of a clamped record to be played and, more particularly, to a new and improved mechanism for clamping a record to be played to a turntable and simultaneously sensing the appropriate speed at which the phonograph should be played for that record.

The sensing of the size of a center-hole of a selected record to determine and provide the proper turntable speed of rotation is known in the art. A turntable speed control mechanism based upon the sensing of the size of the center-hole of a selected record is shown and described in Kenney et al. U.S. Patent No. 3,034,792, assigned to the same assignee as the present invention.

It is well known in the art to provide records requiring a different rotational speed of a turntable (e.g., 33⅓ r.p.m. vis-a-vis 45 r.p.m.) with differently sized center-holes. In the arrangement shown in the Kenney et al. patent, a record to be played is positioned on a support area of a turntable. A clamp arm for holding the record to the support area of the turntable is brought to bear against the side of the record away from the turntable, so that the record is sandwiched or clamped beween the turntable and the clamp arm. A frusto-conical projecting portion is located on the clamp arm, and this portion has a maximum base diameter that substantially coincides with and fits within a large diameter center-hole of a record, but not a small diameter center-hole. Also, the projecting portion is provided with an integral cylindrical spindle element that extends from the minimum diameter top of the projecting portion. The diameter of the spindle element substantially coincides and fits within a small diameter center-hole, as well as a central socket provided in the turntable.

If a record having a large diameter center-hole is selected, the clamp arm will move to a position such that the projecting portion protrudes through the center-hole and the spindle element is received in the socket to a maximum extent, whereby a switch is actuated to provide a rotational speed for the turntable corresponding to the speed required for the selected large diameter center-hole record. In this position an annular flange immediately behind the maximum diameter base of the projecting portion bears against the record to clamp the record against the turntable. If a record having a small diameter center-hole is selected, the clamp arm cannot move as far as in the case of the large diameter center-hole because the projecting portion cannot pass through the record. The record is still clamped against the turntable, but by the minimum diameter top of the projecting portion itself, rather than by the annular flange. Also, the spindle element is received in the turntable socket, but not to as great a depth as in the previously described case of a large diameter center-hole record. Under these circumstances, the clamp arm is located in a position in which the aforementioned switch provides a different speed of rotation for the turntable, corresponding to the speed required for the selected small diameter center-hole record.

In either event, neither the projecting portion nor the flange behind it are directly opposite the support areas on the turntable, so that the record may tend to become bowed during playing, in which event a distortion of the reproduced sound (or "rumble") would result. Another potential disadvantage of the Kenney et al. arrangement is that optimum centering of the selected record may not be achieved since the spindle element does not always penetrate into the socket to a maximum extent. The present invention obviates these difficulties, and, in addition, provides other improvements in an automatic record clamping and speed control mechanism.

Another prior art arrangement involving the sensing of a record center-hole diameter is shown in U.S. Patent No. 3,193,296, Rockola. In the arrangement disclosed in this patent, a horizontal turntable supports a record to be played. Conventional sensing fingers are positioned on the turntable and are actuated by the weight of the record, if the record has a small diameter center-hole. If the record has a large diameter center-hole, the sensing fingers extend through the center-hole and are not actuated. The turntable rotates at one speed if the sensing fingers are actuated, and at another and different speed if the fingers are not actuated.

Briefly, in a preferred form thereof, the present invention achieves new and improved results by having a clamping portion on a clamp arm always contact the selected record directly opposite the supporting areas on the turntable. Thus, the selected record will always be securely clamped to the turntable without any attendant bowing of the record. To achieve this constant clamping effect, the clamp arm must move the same distance for each record regardless of the size of its center-hole. This is opposed to the previously described concept (Kenney et al. patent), wherein the movement of the clamp arm varies with the size of the center-hole diameter in achieving turntable speed control.

A projecting portion used to sense the size of the center-hole of the record is carried by the clamp arm and is movable with respect thereto. Thus, if a record having a large diameter center-hole is selected the operation will be substantially the same as that in the described Kenney et al. mechanism. However, if a small diameter center-hole record is chosen, the projecting portion will be impeded and thus moved with respect to the clamp arm, rather than the clamp arm itself being further displaced inwardly of the record. The presence or absence of the indicated relative movement of the projecting portion causes the appropriate turntable speed to be realized by having a section of the projecting portion contact an actuating arm of a speed determining switch.

An additional feature that is achieved as a result of the indicated uniform positioning of the clamp arm for every record (regardless of its center-hole size) is that the spindle provided on the clamp arm is uniformly seated in an appropriate socket on the turntable for the playing of every record. Uniform seating of the spindle in its socket permits maximum penetration of the spindle into the socket and, therefore, accurate centering of the selected record, independently of the record's center-hole diameter.

Yet another feature of the present invention is that control of the turntable speed is achieved by the use of a pulse relay in association with the speed determining switch. The pulse relay prevents the occurrence of audio distortion (or "hum") that may accompany the use of a constantly energized relay. In order to maintain the desired positions of the relay contacts during playing of the selected record, a mechanical latching feature is used. After the record has been played, the latch is mechanically undone through an appropriate mechanical linkage, and control of the turntable speed is achieved by varying the pole wiring of the turntable motor through the relay contacts.

In accordance with the described arrangement, a primary object of the present invention is to provide an automatic phonograph record clamping and speed controlling mechanism that is sensitive to the diameter of the center-hole of a record to be played, in which the clamp arm for the record is always moved the same distance to the same position, regardless of the particular size of the center-hole of the selected record.

A further object of this invention is to provide a clamping arrangement for a phonograph record in which the record is securely clamped to the turntable without bowing and attendant sound distortion.

Another object of this invention is to provide a record clamping arrangement in which the clamp arm spindle is uniformly seated in the turntable socket to provide improved centering of a record positioned on the turntable.

Yet another object of this invention is to provide a clamp arm for a phonograph automatic speed controlling mechanism to sense the size of the center-hole of the record without causing the clamp arm as such to be displaced from a desired uniform clamping position.

These and other objects, advantages, and features of the subject invention will hereinafter appear, and, for purposes of illustration, but not of limitation, an exemplary embodiment of the subject invention is shown in the appended drawings in which:

FIGURE 9 is a diagrammatic illustration of a mechanical latching arrangement for the relay shown in FIGURE 8.

Figure 1:
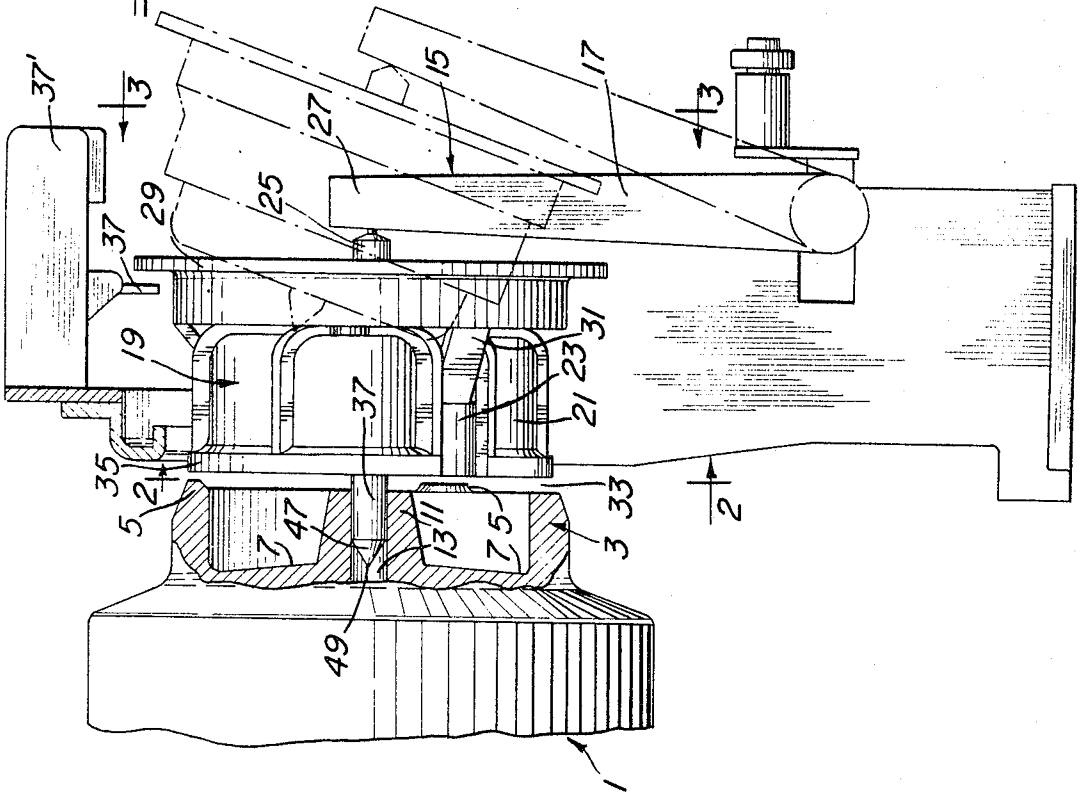
FIGURE 1 is a front elevational and partially broken away view of a device produced in accordance with the preferred teaching of the subject invention.

FIGURE 1 shows a preferred embodiment of the subject invention, with the clamp arm being shown in a full line clamping position and in a broken line standby position, in juxtaposition to a vertically disposed turntable. While the illustrated embodiment is directed toward a clamping arrangement for the playing of records in a vertical plane, it should be realized that the advantages of the subject invention could be equally achieved in structures wherein records are played in a horizontal plane. Also, although the specific description of the present invention herein is directed toward the playing of records requiring two different turntable speeds, one skilled in the art could readily adapt the invention for controlling the playing of records requiring more than two different turntable speeds.

The device shown in FIGURE 1 includes a rotary turntable member 1. Turntable 1 is a standard type of phonograph turntable driven by a conventional turntable motor (not shown), and in fact, as illustrated, turntable 1 substantially corresponds to the turntable shown in the previously mentioned Kenney et al. patent. An annular rim 3 is provided on one side of turntable 1. Rim 3 is formed with three separate supporting areas 5 that are spaced 120° apart on rim 3 and that extend therefrom (to the right as seen in FIGURE 1, wherein two of said areas 5 are illustrated). Supporting areas 5 serve as record support points to bear against a record placed on turntable 1.

A truncated cone member 11 is formed at the centei of the area circumscribed by annular rim 3. Member 11 extends from a base 7 of turntable 1 to a distance corresponding to the height of annular rim 3. A bore, or socket, 13 is formed through the center of member 11 for reception of a spindle element hereinafter to be described.

As shown in full lines in FIGURE 1, a clamp arm 15 is located opposite turntable 1. Clamp arm 15 includes a pivoted arm section 17 and a clamping section 19. Clamping section 19 comprises a clamping element 21 and a projecting portion 23. Clamping element 21 is connected to pivoted arm section 17 by means of a pin 25 that extends into a socket member 27 provided in arm section 17. Projecting portion 23 is generally cup-shaped and is provided with an enlarged diameter annular flange portion 29 that connects to the main hub of projecting portion 23 via struts 31.

When a record is placed in a space 33 defined between clamp arm 15 and turntable 1, arcuate sections 35 provided on clamping element 21 abut the record opposite corresponding supporting areas 5 of annular rim 3 on turntable 1, and spindle 37 on clamp arm 15 is received within socket 13. As previously indicated, an important feature of the present invention is that spindle 37 will always be inserted into socket 13 at the same angle and to the same depth for every record, regardless of center-hole size.

Figure 6:
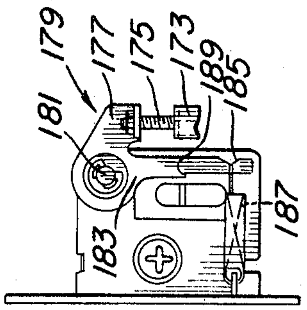
FIGURE 6 is a similar sectional view taken along the line 6—6 in FIGURE 2, showing the clamping position for a large diameter center-hole record.
Figure 5:
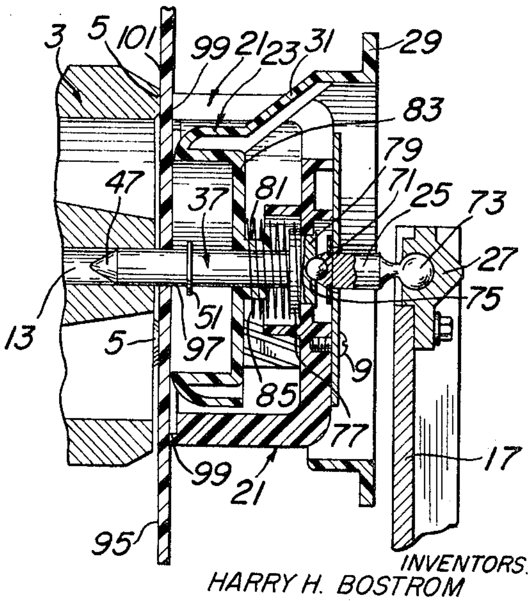
FIGURE 5 is a sectional view taken along the line 5—5 in FIGURE 2, showing the clamping position for a small diameter center-hole record.
Figure 7:
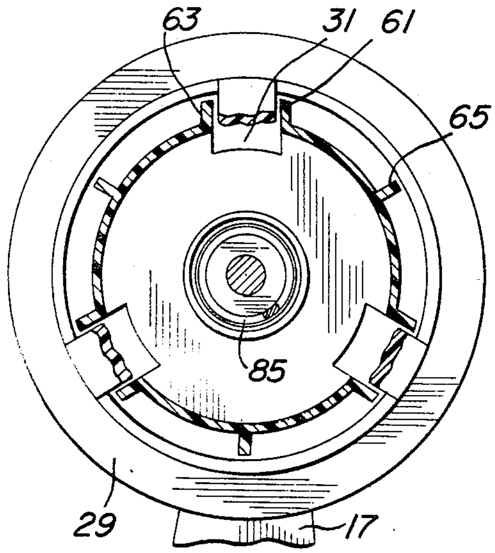
FIGURE 7 is a sectional view taken along the line 7—7 of FIGURE 4.
Figure 6:
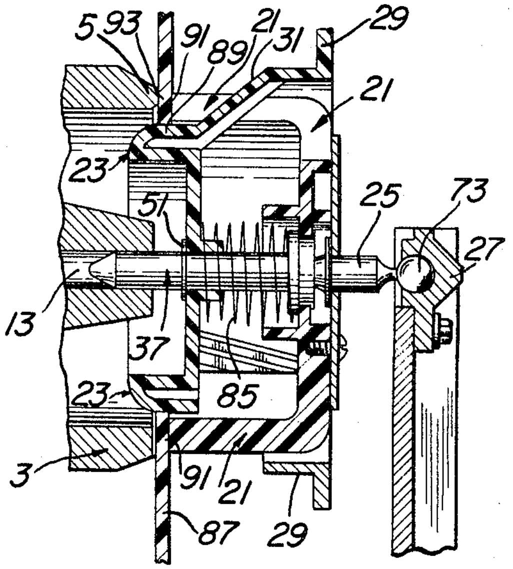

In FIGURES 1 and 5, clamping member 19 is illustrated in a position corresponding to the selection of a record having a small diameter center-hole. In this position, projection portion 23 is displaced from its normal position relative to clamping element 21 (i.e., to the right in FIGURES 1 and 5), and therefore flange portion 29 is also correspondingly displaced relative to clamping element 21. It should be noted that projecting portion 23 is located internally of the clamping element 21, while flange portion 29 is located externally of clamping element 21. With flange portion 29 located in the indicated displaced position, turntable 1 is driven at a rotational rate corresponding to the speed required for a record having a small diameter center-hole (e.g., 33⅓ r.p.m.). On the other hand, when a record having a large diameter center-hole has been selected (as is illustrated in FIGURE 6), projection portion 23 extends through the center-hole of the record (since projecting portion 23 is not displaced relative to clamping element 21), and flange portion 29 thus contacts a switch actuating arm 38 of a switch 38' (shown in more detail in FIGURE 8). This contact with actuating arm 38 causes a switching action to be achieved so that the pole wiring of the turntable motor is changed to realize a different speed of turntable rotation, corresponding to that desired for a record having a large diameter center-hole (e.g., 45 r.p.m.).

This description thus far has involved a reference to two different rotation speeds for the turntable, such as 45 and 33⅓ r.p.m. An example of another desired speed ratio might be 33⅓ and 16⅔ r.p.m., depending upon the particular application. Again, it should be emphasized that, while this description is directed toward a speed control for only two turntable speeds, a modification of the described system to provide more than two turntable speeds can be readily accomplished.

When the selected record has been played, clamp arm 15 is returned to its normal standby position shown in broken lines in FIGURE 1. With clamp arm 15 in this position, the played record may be returned to its storage magazine to permit another selection to be made, as desired. It should be noted that in the broken line position of FIGURE 1 projecting portion 23 would return to its normal position after being removed from contact with a record having a small diameter center-hole.

Figure 2:
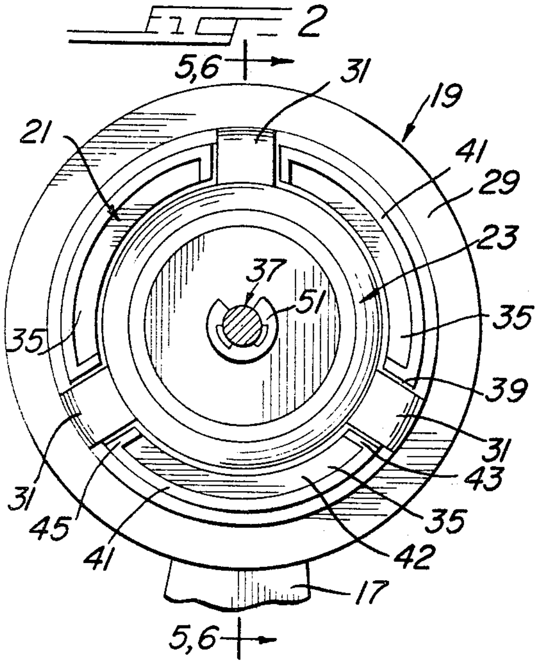
FIGURE 2 is an enlarged fragmentary side view of a main portion of the device illustrated in FIGURE 1, taken along the line 2—2 thereof.
Figure 3:
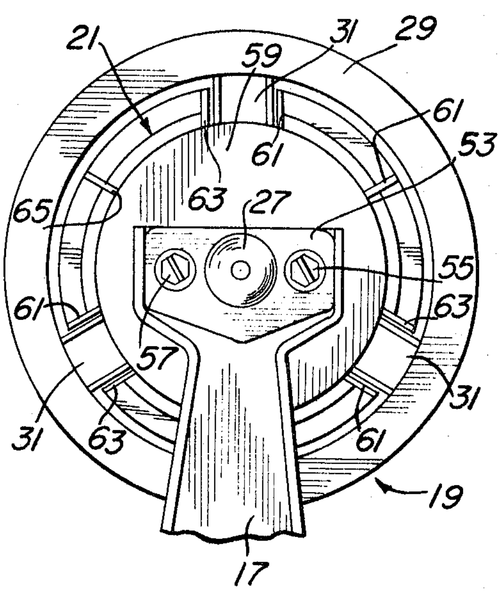
FIGURE 3 is a view of the opposite side of the portion illustrated in FIGURE 2, taken along the line 3—3 of FIGURE 1.
Figure 4:
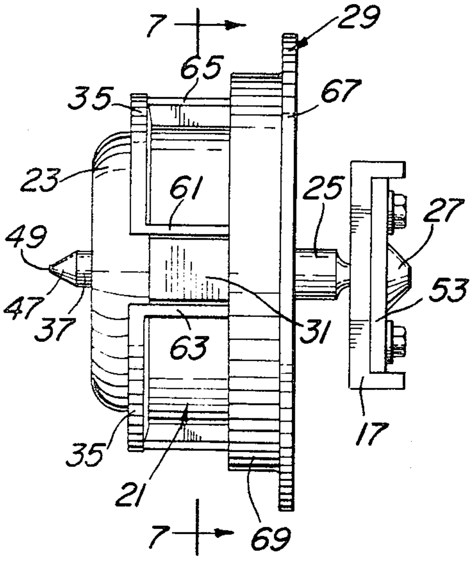
FIGURE 4 is a top plan view of the portion illustrated in FIGURES 2 and 3.

To better aid in visualizing the structural details of clamp arm 15, reference may be had to FIGURES 2–4. The outermost section of clamp arm 15 is flange portion 29. As previously mentioned, legs or struts 31 (three in number) are shown extending from flange 29 to the main hub of projecting portion 23. Struts 31 extend through openings 39 defined between adjacent sections 35 (similarly three in number) in the upper portion of clamping element 21. Each of the arcuate sections 35 is provided with a raised portion 41 extending between two openings 39, and a recessed portion 42 bounded on three sides by raised portion 41. Each raised portion 41 extends along the outer diameter of its arcuate section 35 and radially inward at each end in portions 43 and 45. The raised portions 41 of arcuate sections 35 contact the record and provide the clamping action.

Projecting portion 23 is axially movable on spindle 37 which extends through the center thereof. Spindle 37 has a spear end 47 which comes to a point at 49 and which is adapted to extend into socket 13 in turntable 1. A lock washer stop 51 is spaced away from end 47 to limit the maximum movement of projecting portion 23 toward end 47 of spindle 37.

Spindle 37 is connected to clamping element 21 by means of a flange 77 and a plug type member 79. Recess 75, which contains ball 71, is located within the plug member 79. Projecting portion 23 is mounted on spindle 37 by means of a cylindrical collar 81. Collar 81 extends from the main hub 83 of projecting portion 23. A spring 85 surrounds collar 81 and extends from hub 83 to the base of clamping element 21. Spring 85 normally biases projecting portion 23 toward stop 51 and the turntable for any given position of clamping element 21.

As previously indicated, FIGURE 6 is identical to FIGURE 5, except that a record having a small diameter center-hole is shown in FIGURE 5 while a record having a large diameter center-hole is shown in FIGURE 6. A comparison of these two figures readily illustrates the bifunctional operation of clamp arm 15. FIGURE 6 shows a record 87 having a large diameter center-hole 89. As clamp arm 15 is moved from the broken line position of FIGURE 1 to the solid line position of FIGURE 1, projecting portion 23 extends through center-hole 89 of record 87. The positioning of clamp arm 15 causes clamping element 21 to contact record 87, as indicated at 91. On the opposite side, record 87 bears against the supporting areas 5 of rim 3 on turntable 1, as indicated at 93. Clamp arm 15 moves far enough towards record 87 so that record 87 is securely clamped between clamping element 21 and turntable 1. Since projecting element 23 easily extends through center-hole 89, spring 85 biases projecting portion 23 against stop 51. Therefore, flange portion 29 is correspondingly moved to deflect switch actuating arm 38, which then functions to initiate pulse switching of the turntable motor to yield the desired turntable speed of rotation, as hereinafter described.

On the other hand, a record 95 having a small diameter center-hole 97 is shown in FIGURE 5. With this type of record, end 47 of spindle 37 extends into socket 13 in the turntable, just as it does for a record having a large diameter center-hole. Also, clamping element 21 abuts against record 95, as indicated at 99, and turntable 1 also abuts against record 95, as indicated at 101, to securely clamp the record in the same manner as was done for a record having a large diameter center-hole. However, in this instance, projecting portion 23 abuts against record 95, rather than extending through the center-hole, so that projecting portion 23 is displaced against the bias of spring 85. As projecting portion 23 is thus displaced, flange portion 29 moves correspondingly and does not contact actuating arm 38, so that the turntable motor remains in its normal state to provide a turntable speed of rotation corresponding to the playing of a record having a small diameter center-hole.

A particular arrangement of switch 38′ and the particular pulse relay-pole switching arrangement (which, as previously indicated, provide an additional feature of the subject invention) may be best described with reference to the diagram of FIGURE 8. As shown therein, the switch actuating arm 38 contacted by flange portion 29 is actually one of four identical arms 38. Each of the arms 38 is connected to a solid central portion. 103, which has a square cross section. Each of arms 38 is connected to the member 103 on a respective side of the square cross section thereof. Solid member 103 is arranged to pivot about a point 105.

A movable contacting arm 107 is located adjacent one side of the square cross section of solid member 103. Movable contacting arm 107 is securely fastened, at one end thereof, in an insulating base 109. Insulating base 109 also supports one end of a stationary contact supporting arm 111. Stationary contact supporting arm 111 carries a stationary contact 113. Normally, movable contacting arm 107 and stationary contact 113 are separated from each other.

Figure 8:
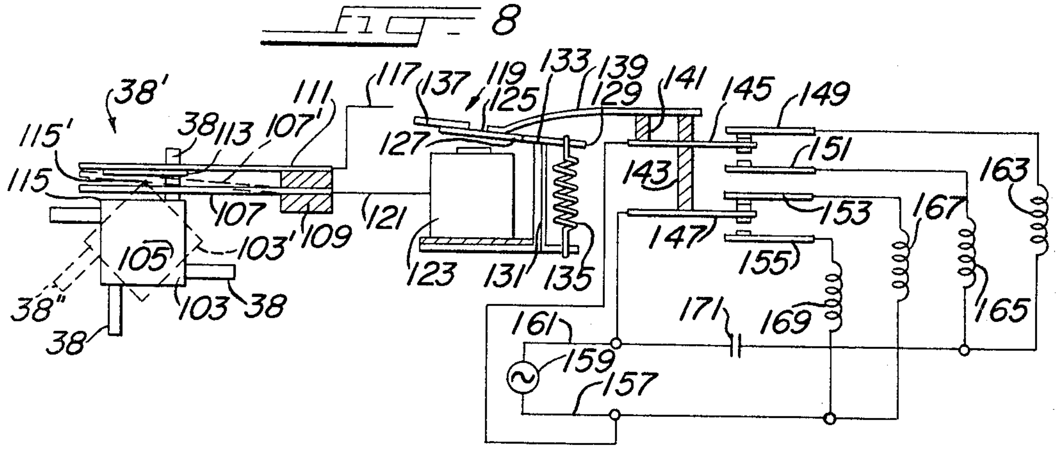
FIGURE 8 is a schematic diagram illustrating a switch and relay arrangement for pole switching of a motor that forms an additional and preferred feature of the subject invention.

When flange portion 29 contacts one of the switch actuating arms 38, the switch actuating arm 38 and the solid member 103 are rotated to the position illustrated in dotted lines and labeled 38″ and 103′, respectively, in FIGURE 8. Rotation of solid member 103 causes a corner 115 of the solid member 103 to move so that it is positioned as illustrated by corner 115′ in the dotted line arrangement. During its motion, corner 115 of solid member 103 bears against the movable contacting arm 107 to transfer arm 107 to the position shown in dotted lines and indicated by the numeral 107′. In this position the movable contacting arm bears against stationary contact 113. Stationary contact 113 is connected to a DC voltage on line 117, and movable contacting member 107 is connected to a relay 119 through a lead 121. Therefore, an abutting of movable contacting arm 107 with stationary contact 113 causes a DC potential to be applied to relay 119. As the solid member 103 continues to rotate until it is moved 90°, relay 119 is given only a momentary, or pulse, energization, before movable contacting arm 107 is removed from abutment with stationary contact 113.

Relay 119 is a conventional type of relay having an insulated coil section 123 and an armature 125. Armature 125 has a major portion 127 and a rearwardly extending portion 129 and is pivoted in support member 131 at point 133. Armature 125 is normally maintained in the position shown in FIGURE 8 by a bias spring 135 connected to the rearwardly extending portion 129. A latch bar 137 (the function of which will be discussed hereinafter) is fastened to the major portion 127 of armature 125.

Relay 119 may actuate its associated contacts in any conventional manner, but for purposes of illustration the control of the associated contacts is schematically indicated as being accomplished by an actuating rod 139 fastened to armature 125. Rod 139 carries a pair of actuating members 141 and 143 formed of insulating material. Actuating members 141 and 143 are associated with movable contacts 145 and 147, respectively. Movable contact 145 is operatively associated with a pair of stationary contacts 149 and 151, while movable contact 147 is operatively associated with a pair of movable contacts 153 and 155.

Electrically, movable contact 145 is connected to a line 157 representing one side of an AC power source 159. On the other hand, movable contact 147 is connected to a line 161 representing the other side of AC power source 159. Each of the stationary contacts 149–155 is connected to one end of a motor winding 163, 165, 167, and 169 respectively. The other ends of motor windings 163 and 165 are connected to line 161 through capacitor 171, while the other ends of motor windings 167 and 169 are connected to line 157.

During normal operation as depicted in FIGURE 8, it may be seen that motor windings 163 and 167 are energized. These windings correspond to a turntable motor speed suitable for playing a record having a small diameter center-hole. If a large diameter center-hole record is to be played, relay 119 will be momentarily energized through switch 38' and the circuits to motor windings 163 and 167 will be opened, while the circuits to motor windings 165 and 169 will be closed. Motor windings 165 and 169 correspond to a turntable motor speed suitable for playing a record having a large diameter center-hole.

In a preceding portion of this specification, it was pointed out that the pulse energization of relay 119 prevents undesirable audio-distortion known as "hum" resulting from the current flow in a constantly energized relay. However, during the entire playing of a record having a large diameter center-hole movable contacts 145 and 147 must remain in abutment with stationary contacts 151 and 155, which means that armature 125 must be retained in a position corresponding to energization of relay 119. To accomplish this result, the latching arrangement shown in FIGURE 9 is utilized in conjunction with latch bar 137.

In the diagram of FIGURE 9, latch bar 137 is seen from the end (corresponding to a view from the left in FIGURE 8). A clutch lever 173 is normally positioned in an abutting relationship with an adjustment screw 175. Screw 175 is located in a portion 177 of a latching arm 179, which is pivoted about a point 181. Latching arm 179 includes an elongated portion 183. A notch 185 is formed adjacent the extended end of portion 183, and a biasing spring 187 is connected to portion 183 at notch 185. Biasing spring 187 tends to rotate latching arm 179 in a direction to force adjustment screw 175 against clutch lever 173. A shoulder 189 is formed on elongated portion 183 adjacent latch bar 137.

During the time that the phonograph is inactivated (corresponding to the broken line standby position of clamp arm 15 in FIGURE 1), clutch lever 173 is in an upper position as shown in FIGURE 9, wherein the rotation of latching arm 179 in a clockwise direction is prevented. When the phonograph is actuated to play a record, the clutch lever 173 is moved to a lower position, and bias spring 187 rotates latching arm 179 in a clockwise direction to force elongated portion 183 against latch bar 137. If a small diameter center-hole record is to be played, latch bar 137 will remain in the position shown and turntable motor windings 163 and 167 will be energized. However, if a large diameter center-hole record is to be played, relay 119 will be energized and latch bar 137 will be moved downward (in the FIGURE 9 disposition of elements). When latch bar 137 is moved below shouder 189, spring 187 will maintain shoulder 189 above latch bar 137 to retain the latch bar in its lower position until the clutch lever 173 is returned to the upper position (shown in FIGURE 9) after the record has been played. The return of clutch lever 173 to the upper position is achieved by a mechanical linkage to the phonograph trip mechanism (not shown). Thus, turntable motor windings 165 and 169 are energized during the entire playing of a large diameter center-hole record, but the relay 119 need only be energized momentarily prior to the playing of the record.

It should be understood that the embodiment described is merely exemplary of the preferred practice of the present invention and that various changes, modifications, and variations may be made in the arrangements, operations, and details of construction of the elements disclosed herein, without departing from the spirit and scope of the present invention.

What is claimed is:

1. In an automatic phonograph adapted to play an intermixture of records with center-holes of different diameters, all the records with a center-hole of the same diameter having the same playing speed, which is different from the playing speed of records having a center-hole with a different diameter, a turntable having supporting areas on which the records to be played are positioned, and an automatic speed control mechanism comprising a clamp arm for clamping a selected record to the turntable, the improvement comprising:

- a clamping element on the clamp arm;
- a hole-size sensing member reciprocably mounted on the clamp arm concentric with said clamping element for reciprocable motion relative to said clamping means and adapted to cooperate with the center-hole of a record in playing position;
- bias means for urging said sensing member away from the clamping arm; and
- means responsive to the position of said sensing member to cause the turntable to be rotated at a speed dependent upon the size of the center-hole, said sensing member being arranged to provide stationing of the clamp arm at the same position for the playing of every record, regardless of the size of its center-hole, so that said clamping element is always forcefully applied to the record being played on the side of the record away from the turntable and at a spot immediately opposite the supporting areas on the turntable.

2. An improved clamping arrangement as recited in claim 1 wherein said sensing member comprises a projecting portion reciprocably movable with respect to the clamp arm along the line of direction in which said clamp arm moves and shaped to pass through the center-hole of a selected record having a large diameter center-hole but not through the center-hole of a selected record having a small diameter center-hole, whereby the center portion of a selected record having a small diameter center-hole will obstructively engage said projecting portion to move said projecting portion with respect to the clamp arm when the clamp arm is being advanced to said same position.

3. An improved clamping arangement as recited in claim 2 and wherein said means comprises a switching means which controls the playing speed at which the turntable rotates, said switching means being actuated by the movement of said projecting portion relative to the clamp arm to cause a playing speed to be produced corresponding to the diameter of the center-hole of the selected record.

4. An improved clamping arrangement as recited in claim 3 wherein:

- said clamping element comprises a plurality of arcuate sections located at a uniform distance from the midpoint of the center-hole of a selected record;
- said sensing member further comprises an outer flange portion fixedly connected to said projecting portion; and
- said projecting portion is positioned within the internal circumference of said clamping element and arranged to move relative thereto, while said flange portion is positioned without the external circumference of said clamping element and arranged to move relative thereto, whereby the movement of said projection portion relative to said clamping element when a selected record has a large diameter center-hole causes said flange portion to actuate said switching means.

5. An improved clamping arrangement as recited in claim 4 and further comprising:

a spindle having one end fastened to the clamp arm, the free end of said spindle extending through the center of said projecting portion and through the center-hole of a selected record;

a socket in the turntable for receiving the free end of the spindle;

a spring surrounding a portion of said spindle and having one end abutting a fixed portion associated with said clamping element; and stop means located on said spindle at a predetermined distance from said free end, said projecting portion being located on said spindle between said spring and said stop member so that said projecting portion is normally biased against said stop means, whereby the engagement of said projecting portion with a selected record having a small diameter center-hole causes said projecting member to be driven against the bias of said spring to prevent said flange portion from actuating said switching means and to uniformly seat the free end of said spindle in said socket to center the selected record on the turntable even when a small diameter center-hole record is being played.

6. An improved clamping arrangement as recited in claim 4 wherein said switching means comprises:

a pulse relay having a plurality of sets of contacts to control the playing speed of the turntable, each of said sets of contacts including a movable contact and a pair of stationary contacts;

a switch arm actuated by said flange portion of said sensing member to effect the energization of said pulse relay; and latching means for maintaining said sets of contacts in a position corresponding to energization of said pulse relay to maintain the corresponding record playing speed during the playing of the selected record.

References Cited

UNITED STATES PATENTS

| | | | |
|---|---|---|---|
| 2,634,134 | 4/1953 | Dietz | 274—39 X |
| 2,826,418 | 3/1958 | Johnson. | |
| 2,943,861 | 7/1960 | Redfield | 274—39 X |
| 3,034,792 | 5/1962 | Kenney et al. | 274—10 |
| 3,162,447 | 12/1964 | Hartman | 274—9.1 |

HARRY N. HAROIAN, *Primary Examiner.*

U.S. Cl. X.R.

274—39